Patented Feb. 15, 1938

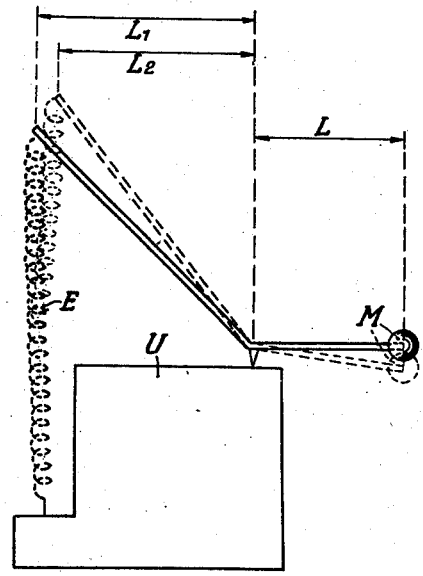

2,108,421

UNITED STATES PATENT OFFICE 2,108,421

GRAVITATIONAL INSTRUMENT

Stephan Baron von Thyssen-Bornemisza, The Hague, Netherlands

Original application September 6, 1934, Serial No. 742,878. Divided and this application October 16, 1935, Serial No. 45,190. In Germany July 9, 1934

3 Claims. (Cl. 265—1.4)

The invention is a division of my copending application Ser. No. 742,878, filed Sept. 6, 1934. The subject of said copending application is a measuring instrument for the determination of variations of the gravitational acceleration which consists of a lever system comprising a lever connected with a mass and arranged in such a manner that a variation of the gravitational acceleration changes its position, thereby producing an oscillation showing the variation of the gravitational acceleration. A spring acts against the movement of the lever system in such a manner, that an increase of the gravitational acceleration produces an increase of the lever arm of the mass.

The present invention relates to a measuring instrument for the determination of variations of the gravitational acceleration which also consists of a lever system and a spring and in which by an increase of the gravitational acceleration the lever arm upon which the spring acts is shortened.

The invention will be more clearly described with reference to the accompanying drawing. Therein the lever system consists of a bent beam comprising a horizontal portion and a further portion extending upwards. At the end of the horizontal portion a mass M is arranged, whereas a spring is situated at the end of the portion extending upwards, said spring balancing the mass. At the place where the beam is bent there is provided a knife edge. In the original position the lever arm of the mass is shown at L and the lever arm of the spring E at $L_1$. Upon an increase of the gravitational acceleration the mass moves downwards, whereas the spring is expanded. The lever arm of the mass remains practically unaltered, whereas the lever arm of the spring is decreased from $L_1$ into $L_2$. Thus, if the equilibrium is disturbed there is caused at first a displacement of the mass, in consequence of said displacement a decrease of the counter force produced by the spring and then again a displacement of the mass. The relation between the several portions has to be regulated for instance by controlling the oblique position of that part of the beam which is seized by the spring in such a manner that the sensitiveness against the variations of the gravitational acceleration which are to be expected is of a convenient height.

What I claim and desire to secure by Letters Patent of the United States is:

1. In a measuring instrument for the determination of variations of the gravitational acceleration a lever system comprising a beam comprising one part lying substantially horizontal and a second part extending obliquely upwards, a mass attached to the end of the horizontal portion, a spring attached to the end of the obliquely positioned portion, a knife edge upon which the beam is pendulating and a connection for the lower end of the spring.

2. In a gravitational instrument an angularly shaped, pivotally supported lever, a mass attached to one arm of said lever and a spring attached to the other arm of said lever and opposing variation in the position of the mass, whereby any movement of the latter caused by an increase of the gravitational acceleration diminishes the effective length of the lever arm of the spring in relation to that of the lever arm of the mass.

3. In a gravitational instrument a lever system comprising a rigid structure pivotally arranged, a mass being attached to the one side of said structure in a horizontal plane substantially equal to that of the pivoting point of the rigid structure so that the lever arm of the mass remains substantially unchanged upon a variation of the gravitational acceleration, and a spring attached to the other side of the rigid structure in a horizontal plane different from that through the pivoting point so that the effective length of the lever arm of the spring is decreased upon an increase of the gravitational acceleration.

STEPHAN BARON VON THYSSEN-BORNEMISZA.